United States Patent [19]

Riva

[11] Patent Number: 5,223,134
[45] Date of Patent: Jun. 29, 1993

[54] DEVICE FOR THE RAPID FASTENING AND UNFASTENING OF TUBULAR FILTERING FABRICS

[76] Inventor: Carlo Riva, Via Valserrata, 6826 Riva S. Vitale, Switzerland

[21] Appl. No.: 946,028

[22] Filed: Sep. 15, 1992

Related U.S. Application Data

[63] Continuation of Ser. No. 601,001, Oct. 19, 1990, abandoned.

[30] Foreign Application Priority Data

Oct. 31, 1989 [CH] Switzerland ............ 3925/89-3

[51] Int. Cl.$^5$ ............................................. B01D 29/05
[52] U.S. Cl. ......................................... 210/232; 55/379; 210/323.2; 210/497.01; 292/256.67
[58] Field of Search .............. 55/379; 210/232, 323.2, 210/497.01; 292/256.6, 256.61, 256.65, 256.67

[56] References Cited

U.S. PATENT DOCUMENTS

| | | | |
|---|---|---|---|
| 4,094,790 | 6/1978 | Schmidt, Jr. ............ | 210/289 |
| 4,345,924 | 8/1982 | Margraf .................. | 210/323.2 |
| 5,006,243 | 4/1991 | Arnaud ................... | 55/379 |

FOREIGN PATENT DOCUMENTS

| | | |
|---|---|---|
| 1812520 | 6/1970 | Fed. Rep. of Germany . |
| 2377832 | 8/1978 | France . |
| 2494594 | 5/1982 | France . |
| 1086590 | 10/1967 | United Kingdom . |
| 1375188 | 11/1974 | United Kingdom . |

*Primary Examiner*—Ivars Cintins
*Attorney, Agent, or Firm*—Young & Thompson

[57] ABSTRACT

A device for the rapid fastening and unfastening of a tubular filtering fabric, comprises:
  a) a bearing structure (1, 1', 1") able to support filtering fabric (7) in the form of the desired tubular section;
  b) a fastening sleeve (2, 2') placed at each end of the tubular filtering fabric (7) and working with an outside ring (3, 3') and an inserted annular seal (5, 5') to allow tight anchoring of each of the ends of the tubular filtering fabric; and
  c) a fastening head (4, 4') placed at each end of the filtering fabric (7) and working with the fastening sleeve (2, 2') to press the ring (3, 3') tight in a stable manner against the sleeve (2, 2').

4 Claims, 1 Drawing Sheet

DEVICE FOR THE RAPID FASTENING AND UNFASTENING OF TUBULAR FILTERING FABRICS

This application is a continuation of application No. 07/601,001, filed Oct. 19, 1990, now abandoned.

FIELD OF THE INVENTION

This invention has as its object a device for rapid fastening and unfastening of tubular filtering fabrics, whether they be metallic or plastic or any other fabrics.

The device according to the invention essentially has the following purposes:
  to allow making filtering elements in the most varied shapes and in different materials;
  to allow fastening of a filtering fabric without glue or other elements in general that do not allow a rapid unfastening and refastening of the fabric;
  to allow unfastening and refastening as well as interchangeability of fabrics in a simple and rapid manner, always guaranteeing the same fastening characteristics;
  to allow the adaptability of the filtering element to any type of seal as well as any type of fastening to already existing structures;
  to allow the regeneration of the fabric by unfastening, washing and refastening of it, or by means of counterwashing.

SUMMARY OF THE INVENTION

The device according to the invention is characterized by:
  a) a bearing structure able to support the filtering fabric in the form of the desired tubular section;
  b) a fastening sleeve (2, 2') placed at each end of the tubular filtering fabric and working with an outside ring and an inserted annular seal to allow tight anchoring of each of said ends of the tubular filtering fabric;
  c) a fastening head or slate placed at each end of the filtering fabric and working with said fastening sleeve to press the ring tight in a stable manner against the sleeve.

It is not known to the inventor that similar or equivalent devices now exist.

BRIEF DESCRIPTION OF THE DRAWINGS

The accompanying drawing represent a preferred nonlimiting embodiment of the device according to the invention.

DETAILED DESCRIPTION OF THE INVENTION

Figure 1:
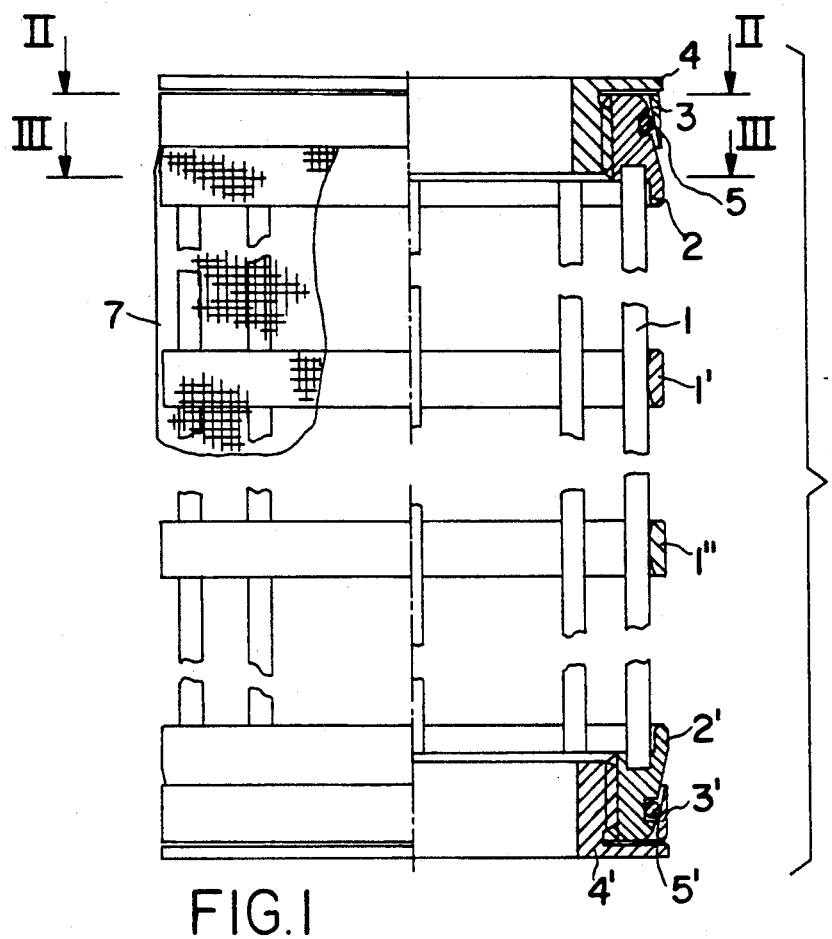
FIG. 1 represents it diagrammatically in front view.
Figure 2:
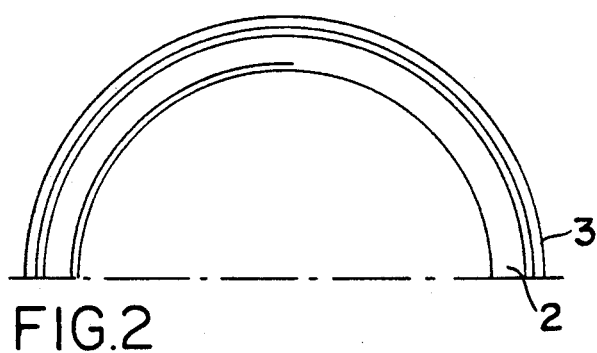
FIG. 2 represents it in a top view in a plane passing through II—II.

The device is characterized by:
  a) a bearing structure 1, 1', 1" (FIG. 1) able to support filtering fabric 7 in the form of the desired tubular section;
  b) a fastening sleeve 2, 2' placed at each end of tubular filtering fabric 7 and working with an outside ring 3, 3' and an inserted annular seal 5, 5' to allow tight anchoring of each of the ends of the tubular filtering fabric;
  c) a fastening head 4, 4' placed at each end of filtering fabric 7 and working with the fastening sleeve 2, 2' to press said ring 3, 3' tight in a stable manner against the sleeve 2, 2'.

Figure 3:
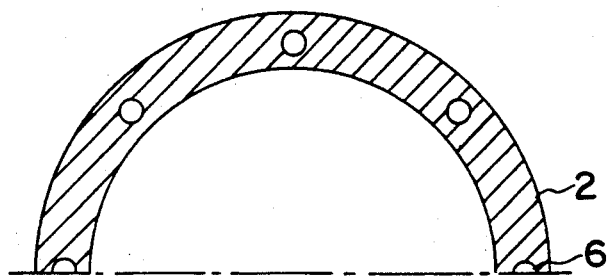
FIG. 3 represents the cross section in a plane passing through III—III.

The bearing structure consists of a plurality of rods 1 inserted at their two free ends, in holes 6 (FIG. 3) of respective fastening sleeves 2,2', rods further reinforced with outside rings 1', 1" located close to or at the central zone of the rods 1.

The outside ring 3, 3' is internally conical to compress corresponding annular seal (O-ring) 5, 5' against corresponding fastening sleeve 2, 2' when it is axially thrust by relative fastening head 4, 4'.

Each fastening head 4, 4' is threaded and screwed in respective fastening sleeve 2, 2' to compress the respective annular seal 5, 5' and the end of the tubular filtering fabric 7 assuring the seal.

It is provided that:
  the bearing structure can have various shapes, diameters and lengths and be made of various materials such as stainless steel, plastics, etc.
  fastening sleeve 2 can be made in various shapes and various ordinary materials, such as steel and plastics;
  the shape of the tubular section can be made so as to avoid tearing the fabric in the fastening phase;
  fastening ring 3 can be made in various shapes and lengths and of hard materials, by which pressure on seal 5 makes possible a solid, tight anchoring of tubular fabric 7 to sleeve 2;
  closing plate or fastening head 4 can be made in various shapes and materials which allow, by various fastening systems, the perfect immobilizing of fastening ring 3.

All this without going outside the scope of protection of the patent.

We claim:

1. In a device for the rapid fastening and unfastening of tubular filtering fabrics, said device having a bearing structure (1, 1', 1") adapted to support a filtering fabric (7) in the form of a tubular section, the improvement comprising:
  a fastening sleeve (2, 2') disposed at each end of said bearing structure and surrounded by an outside ring (3, 3') having an inner conical surface, and an inserted annular seal (5, 5') disposed between the fastening sleeve and the outside ring to allow tight anchoring of a tubular filtering fabric at each of said ends of said bearing structure, thereby avoiding its rolling; and
  a fastening head (4, 4') for fastening a filtering fabric (7) at each end of said bearing structure and interfitting with said fastening sleeve (2, 2') to press said ring (3, 3') in a sealing engagement against said sleeve (2, 2').

2. The device according to claim 1, wherein said bearing structure comprises a plurality of rods (1) each having two free ends, said rods being inserted at their two free ends in holes (6) of said fastening sleeves (2, 2'), said rods further being reinforced with outside rings (1', 1") located adjacent or at a point equidistant from the free ends of said rods (1).

3. The device according to claim 1, wherein said conical surface of said outside ring (3, 3') compresses said annular seal (5, 5') against the corresponding said fastening sleeve (2, 2') upon said outside ring (3, 3') being axially thrust by a respective fastening head (4, 4'), said annular seal being an O-ring.

4. The device according to claim 1, wherein each said fastening head (4, 4') is threaded and screwed in its respective fastening sleeve (2, 2') to compress the respective annular seal (5, 5') and an end of a tubular filtering fabric (7), thereby ensuring a tight seal.

* * * * *